United States Patent [19]

Brandt, Jr.

[11] 4,372,171
[45] Feb. 8, 1983

[54] NOZZLE PITOT AVERAGING PRIMARY

[75] Inventor: Robert O. Brandt, Jr., Garner, N.C.

[73] Assignee: Brandt Industries, Inc., Fuquay-Varina, N.C.

[21] Appl. No.: 196,184

[22] Filed: Oct. 14, 1980

[51] Int. Cl.³ ............................................. G01F 1/46
[52] U.S. Cl. .............................. 73/861.66; 73/861.61
[58] Field of Search ........... 73/861.65, 861.66, 861.67, 73/861.68, 861.61

[56] References Cited

U.S. PATENT DOCUMENTS

| | | | |
|---|---|---|---|
| 1,145,222 | 7/1915 | Wilkinson | 73/861.66 |
| 1,145,234 | 7/1915 | Dodge | 73/861.66 |
| 2,614,423 | 10/1952 | Carbone | 73/861.61 |
| 2,706,409 | 4/1955 | Preston | 73/861.67 |
| 3,355,946 | 12/1967 | Lazell | 73/861.65 |
| 3,590,637 | 7/1971 | Brown | 73/861.65 X |

Primary Examiner—Charles A. Ruehl
Attorney, Agent, or Firm—Mills & Coats

[57] ABSTRACT

A nozzle pitot primary for effectively sensing and measuring differential or velocity pressure of a system of air or gas flowing within a duct or conduit. By determining differential or velocity pressure, it is appreciated that the air or gas flow can be readily determined. The nozzle pitot primary of the present invention comprises a nozzle designed to be installed within a duct or conduit with the nozzle including a constricting throat area relative to the duct or conduit in which the same is installed. Air or gas passing through the duct or conduit is directed through the nozzle so as to produce a generally uniform and predictable velocity profile within the nozzle downstream from the throat area therein. An array of static and total pressure pitots are provided in association with the nozzle and are spaced inwardly across a constricted area where the velocity profile is relatively uniform. Because of the relative uniform velocity profile about the area of the pitots, it follows that an accurate indication of fluid flow can be determined without the necessity of sensing differential pressure at multiple points across the nozzle's cross sectional area.

14 Claims, 4 Drawing Figures

GAMMA (γ) RATIO = $\frac{d1}{d2}$

BETA (β) RATIO = $\frac{d2}{d3}$

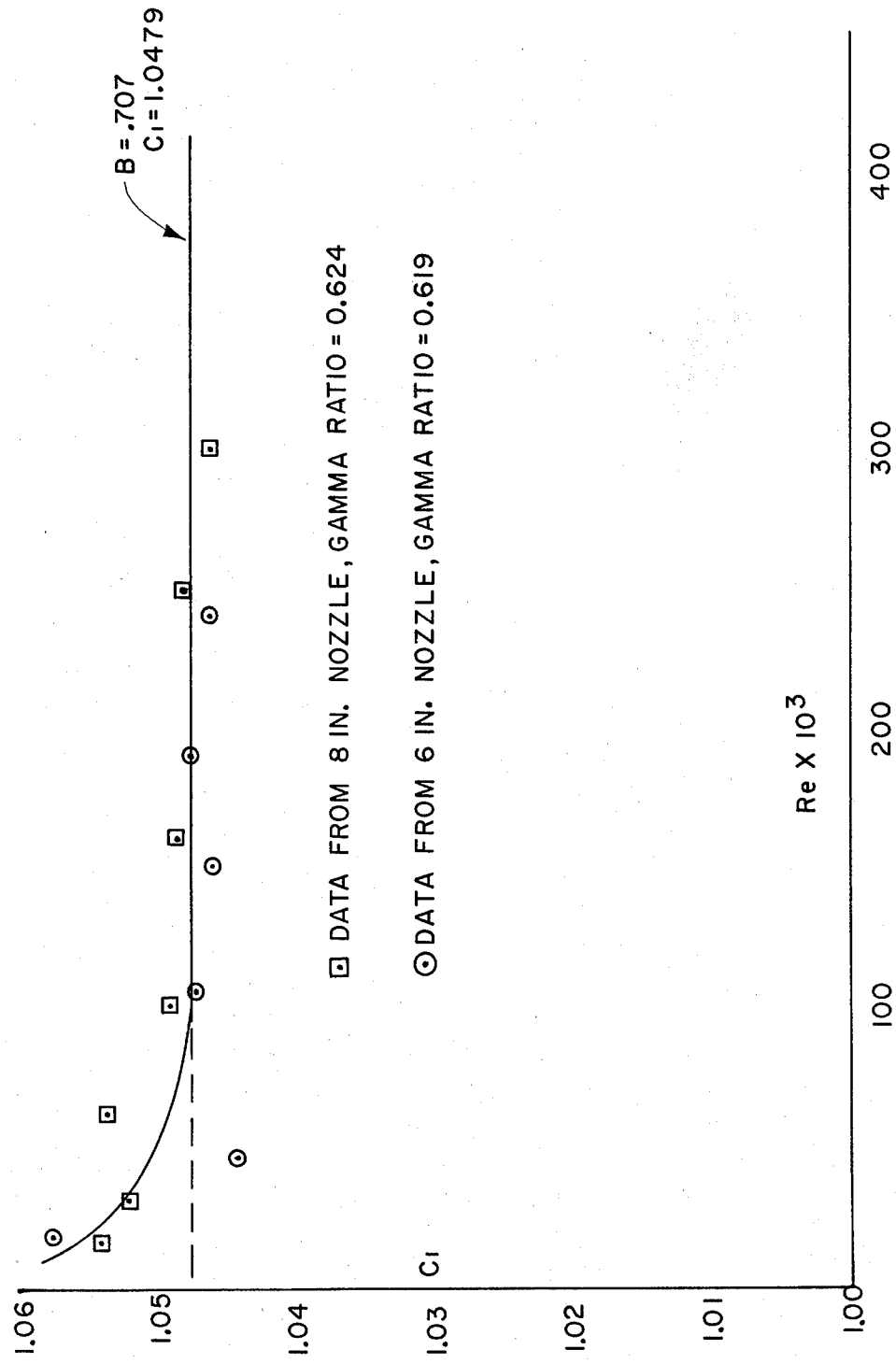

NOZZLE PITOT AVERAGING PRIMARY

BACKGROUND OF INVENTION

Accurately measuring fluid flow in systems of moving gas or air has always been a difficult task to achieve.

The most common approach to measuring fluid flow entails first determining the differential pressure within a system, often referred to as differential velocity pressure since the pressure differential referred to is the difference between the static and total pressure within the moving fluid system. After determining differential velocity pressure of the moving fluid system, it follows that the velocity and flow volume can be determined mathematically.

As a practical matter though, the real problem in measuring fluid flow in a duct is that the velocity profile across the duct or conduit is almost always nonuniform and not predictable. This is especially true about the sides and corners of ducts or conduits.

To accurately measure flow, one method known entails traversing the cross sectional area of the duct with a differential pressure pitot device and to take multiple readings at numerous positions across the duct. These multiple readings are then appropriately averaged and the velocity of the fluid flow can be determined therefrom. This approach, however, is more of a laboratory method of determining fluid flow, and does not lend itself to an in-line commercial or industrial instrument.

There are commercially available primary devices that are known today for measuring air flow. For example, see the disclosures found in U.S. Pat. Nos. 3,981,193; 4,036,054; and 3,785,206. These primary devices include an array of static and total pressure pitots arranged in a duct so as to yield an average flow across the cross sectional area of the duct. For the most part, such primary devices are not very accurate. Although they use an averaging approach, the velocity profile about the sides and corners of the duct is nonuniform and consequently substantial error is likely to be introduced, resulting in inaccurate flow measurement.

SUMMARY AND OBJECTS OF THE INVENTION

The present invention entails a nozzle pitot averaging primary that is designed to give a more accurate and precise fluid flow measurement than commercial and industrial air flow primary devices known today. More particularly, the nozzle pitot averaging primary of the present invention tends to overcome problems of known primary devices by producing a more predictable velocity profile, especially about the outer side and corner regions of the moving fluid system. In fact, the nozzle pitot averaging primary of the present invention tends to yield a predictable velocity profile across substantially the entire cross sectional area of the nozzle portion of the primary. This enables an array of static and total pressure pitots to be arranged in such a way as to more accurately and precisely average the velocity of the fluid flow within the system.

In addition, in the development of the nozzle pitot averaging primary device of the present invention, certain physical relationship between the nozzle, the array of pitots and the size of the main duct or conduit were discovered that are deemed important design considerations. For example, in a cylindrical type design, the ratio of the diameter of the pitot array to the inside or throat diameter of the nozzle seems to be important in averaging and measuring velocity in the fluid stream. Moreover, the ratio of the inside or throat diameter of the nozzle to the diameter of the main duct seems also to be important. These factors and how they are utilized in a particular design is explored in more detail subsequently herein.

It is, therefore, an object of the present invention to provide a more accurate averaging pitot primary device that has the capability to accurately measure fluid flow within a moving fluid system.

A further object of the present invention resides in the provision of an averaging pitot primary that positively acts on the moving fluid so as to produce a more predictable velocity profile, which results in the ability to more accurately and precisely measure fluid flow within the system of moving fluid.

It is a further object of the present invention to provide an averaging pitot primary of the character referred to above that includes means for constricting the flow of fluid therethrough in such a manner as to produce a predictable velocity profile of the fluid passing therethrough, and an array of averaging static and total pressure pitot disposed about the constricted area so as to measure differential velocity pressure in this region.

Another object of the present invention resides in the provision of an averaging pitot primary of the character referred to above that utilizes a nozzle type flow constricting means to produce a generally predictable velocity profile.

Still a further object of the present invention is to provide an averaging nozzle pitot primary that provides a relatively sharp wall boundary for aiding in the shaping of a predictable velocity profile and which overcomes the problems of known primary device of the prior art where the velocity profile about the sides and corners are very erratic and unpredictable.

Another object of the present invention is to provide a nozzle pitot primary of the character referred to above that establishes certain design criteria for the relationship between the nozzle and pitot array, and between the nozzle and the main duct carrying the fluid to be measured.

Another object of the present invention resides in the provision of an averaging pitot primary device of the nozzle or constricting type, wherein the array of pitots is strategically placed with respect to the nozzle such that the primary device is relatively insensitive to Reynolds Number.

Other objects and advantages of the present invention will become apparent from a study of the following description and the accompanying drawings which are merely illustrative of the present invention.

BRIEF DESCRIPTION OF DRAWINGS

FIG. 4 is a graph based on laboratory data used for determining $C_1$, as discussed in the present disclosure, for a Beta ratio of 0.707.

NOZZLE PITOT AVERAGING PRIMARY

Figure 1:
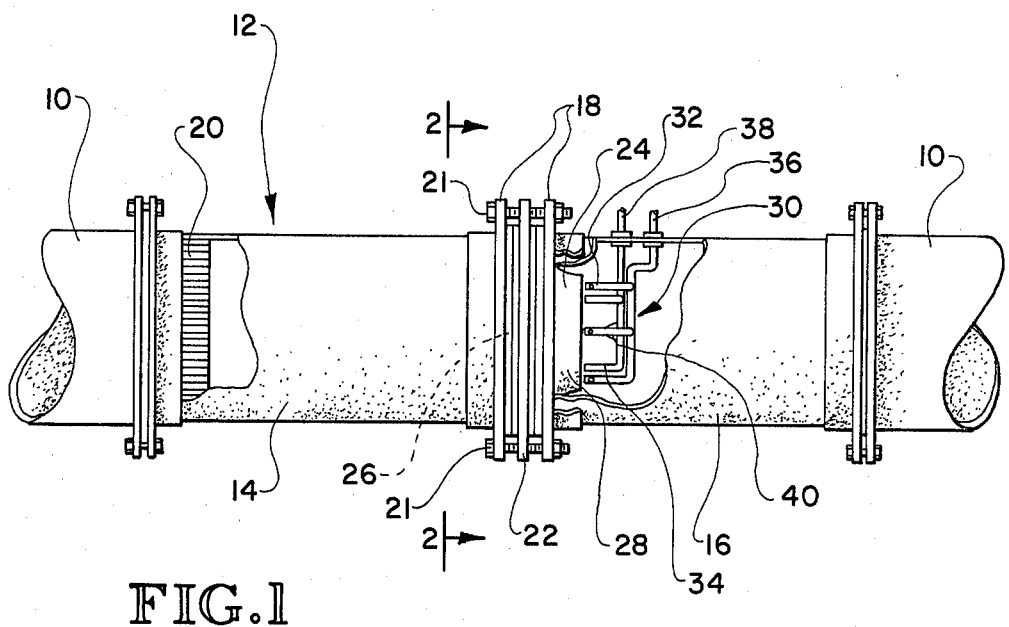
FIG. 1 is a side elevational view of the nozzle averaging primary of the present invention.

With further reference to the drawings, the nozzle averaging pitot primary of the present invention is shown therein in the form of a spool assembly, indicated generally by the numeral 12, and operatively interconnected within a main duct or conduit 10 carrying or channeling the fluid flow to be measured.

Spool assembly 12 includes two cylindrical sections 14 and 16, with each section including two flanged end portions 18. Disposed upstream and within spool section 14 is a flow straightening device 20 that is preferably of a honeycomb cross sectional area and which can be typically constructed of aluminum or stainless steel. This flow straightening device acts to straighten the flow prior to the flow reaching the nozzle pitot primary to be discussed subsequently herein.

Interposed within the spool assembly 12 and particularly connected between cylindrical sections 14 and 16, there is provided flow constricted means in the form of a nozzle. The nozzle includes a flange portion 22 that extends between the flange end portions 18 of the two respective cylindrical sections 14 and 16, and is held therebetween by a series of bolts 21 that extend through the nozzle flange 22 and on through openings provided within the respective flanged end portions 18. It should be noted that a gasket is preferably imposed between each side of the nozzle flange 22 and the respective flanged ends of sections 14 and 16.

As seen in the drawings, the nozzle includes a main wall section 24 that extends from an inlet end 26 of the nozzle to an outlet end 28. Because of the nature of the nozzle, it is appreciated that the diameter of the same becomes progressively smaller from the inlet end 26 thereof to the outlet end 28, with the inside diameter of the nozzle being referred to as the throat diameter and in the present design the diameter of the outlet end 28.

Associated with the nozzle is an array of averaging pitots shown in an assembly form and indicated generally by the numeral 30. This averaging pitot assembly 30 includes a series of alternately spaced static and total pressure pitots 32 and 34 respectively. It is seen that pitots 32 and 34 are arranged in a circular fashion generally co-axial with the axis of the nozzle and arranged in a pattern whose diameter of the array is smaller than the inside or throat diameter of the nozzle.

In conventional fashion, the averaging pitot array assembly 30 includes a series of static pitots 32 that are aligned such that their longitudinal axis extends generally parallel with the axis of the nozzle and cylindrical sections 14 and 16. Likewise, the total pressure pitots 34 are also disposed so as to extend in general parallel relationship with the axis of the nozzle and cylindrical sections 14 and 16. It is appreciated that the static pitots 32 include an opening about the side of the forwardmost tip, with the openings being oriented in a plane generally parallel to the direction of flow of fluid within the main duct 10 and through the spool assembly 12. Also in conventional fashion, the total pressure pitots 34 include tip openings that face or extend transverse to the general direction of fluid flow.

Extending from the averaging pitot assembly 30 is a high pressure outlet tube 38 that is communicatively connected with the total pressure pitots 34 and which is adapted to direct a total pressure signal therefrom. A low pressure tube 36 is communicatively connected with the static pitots 32 and is adapted to direct a low or static pressure signal from the array of averaging static pitots.

As appreciated in the art, by connecting the high and low pressure tubes 38 and 36 of the averaging pitot assembly 30 with a differential pressure transmitter, such as the Brandt Model 21DPT2000, a differential pressure signal can be derived by effectively subtracting the static pressure from the total pressure. In effect this gives what is often referred to as a differential velocity pressure which is related to the square of the velocity. This, of course, enables the velocity or flow within main conduit 10 to be determined mathematically.

Figure 2:
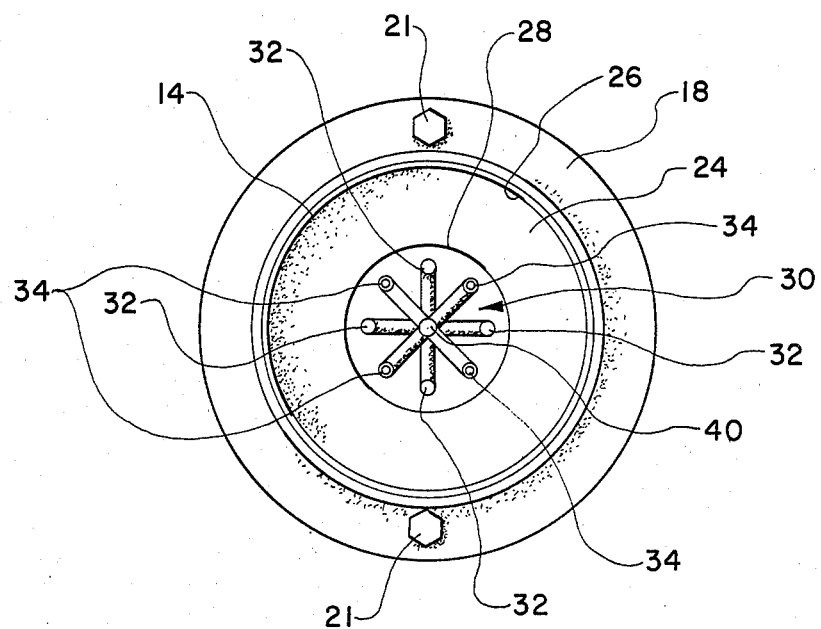
FIG. 2 is a cross sectional view of the nozzle primary taken through the lines 2—2 in FIG. 1.

In order to minimize head loss and to generally improve the profile, a bullet shaped protrusion 40 is provided about the center of the pitot array and faces upstream as seen in FIG. 2.

It is appreciated that the nozzle would include a central axis that would extend axially through the nozzle parallel to the direction of flow of fluid through the nozzle and through the bullet shaped protrusion 40 associated with the pitot array as shown in FIG. 2.

Through a series of tests, it was discovered that a number of physical relationships within the nozzle pitot averaging primary is significant.

Figure 3:
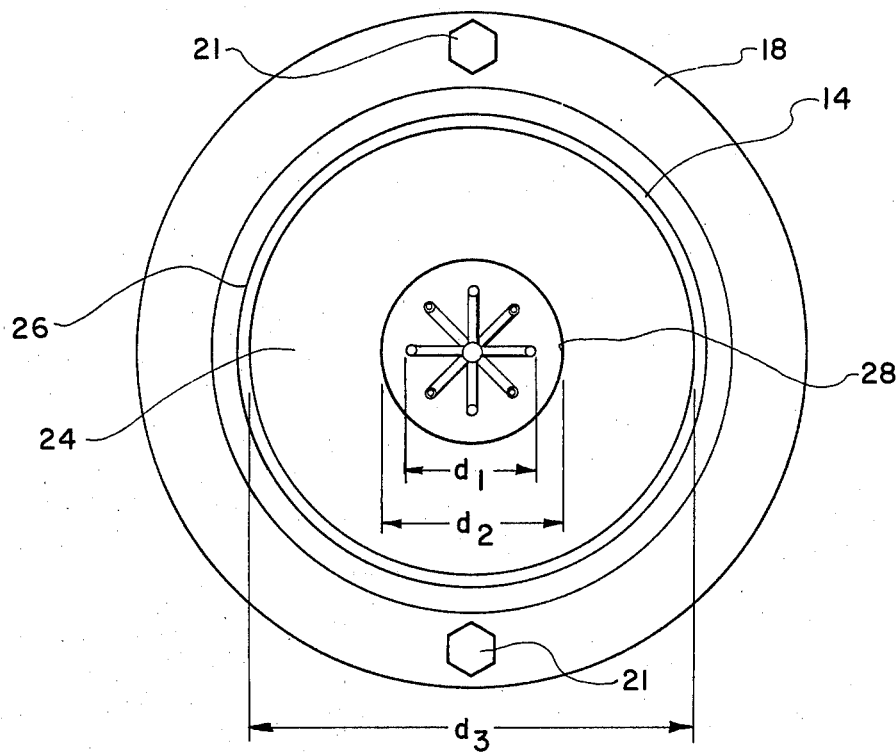
FIG. 3 is a diagrammatic cross sectional view of the nozzle pitot illustrating the Gamma and Beta ratios discussed in the present disclosure.

First, in a cylindrical or circular design, for example, the ratio of the diameter of the pitot array to the throat or inside diameter of the nozzle was found to be important. This is referred to as the Gamma ratio (see FIG. 3) and is considered significant even in cases where the nozzle and/or main duct are not circular or cylindrical.

In the design of the nozzle pitot averaging primary of the present invention, it was deemed desirable that the same be relatively insensitive to Reynolds Number. Through a series of tests for a six-inch nozzle pitot averaging primary for example, an appropriate Gamma ratio was found to be 0.633. At this particular Gamma ratio, Reynolds Number had relatively little effect on the performance of the nozzle pitot averaging primary for Reynolds Numbers exceeding 100,000. Thus based on this test and other such tests it was found that the Gamma ratio for the nozzle pitot averaging primary of the present invention should be approximately 0.633.

In addition it was found that the ratio of the throat or inside diameter of the nozzle to the diameter of the main duct carrying the fluid was another significant relationship. This is defined as the Beta ratio. Based on a series of tests, it was discovered and found that an appropriate Beta ratio for designs of the type disclosed herein was 0.707.

Finally due to the nature of the nozzle pitot averaging primary of the present invention, a correction coefficient C must be determined and provided in order that the effective area, $A_E$, can be calculated in order to accurately determine flow.

In tests conducted by Applicant, it was determined that this correction coefficient would depend and relate to three factors. First, the correction coefficient would depend upon $C_1$, the velocity profile passing through the nozzle and the Beta ratio. Next the area reduction in the plane of the pitot tubes will be a second factor, $C_2$, that will contribute to the overall correction coefficient. Lastly a Gamma ratio correction, $C_3$, will be determined since the position of the array of pitots with respect to the nozzle can influence flow measurement.

Consequently the final correction coefficient C can be said to be a product of all three of these factors; i.e., $C = C_1 \times C_2 \times C_3$. Through laboratory tests, these individual correction factors can be determined and from them the final overall correction coefficient C can be determined.

The following is an example for determining the correction coefficient C for a nozzle having a throat diameter of 22 inches, a Gamma ratio of 0.640, a Beta ratio of 0.707 and eight ⅛ inch pitot probes. As pointed out above, the total or final correction coefficient C will be the product of $C_1$ (correction due to Beta ratio and profile shape), $C_2$ (due to the area reduction of the pitot probes) and $C_3$ (correction relating to the Gamma ratio factor).

First, with respect to $C_1$, one is referred to FIG. 4. $C_1$ is a constant due to profile and is plotted against Reynolds Number. This determination can be accomplished through laboratory tests and as seen from the graph, for a Beta ratio of 0.707, $C_1$ is determined to be 1.0479.

$$C_2 = (A - A_p) \div A$$

where
A = area of nozzle
$A_p$ = area of pitots $$A \text{ (nozzle)} = 22^2 \times \pi \div 576 = 2.6398 \text{ ft}^2$$

$$A_p = (1.125^2 \times \pi) \div 576 \times 8 = 0.00068 \text{ ft}^2$$

$$C_2 = 2.6398 - 0.00068 \div 2.6398 = 0.99974$$

An equation was derived for $C_3$ and this is as follows:

$$C_3 = (0.25)(0.640) + 0.841675 = 1.0017$$

$C_3$ is correct only for a Beta ratio of 0.707 and for high Reynolds Numbers. The worst error that the Gamma ratio contributes is where the Reynolds Number is low and for this reason the Gamma ratio should be held as close to 0.633 as possible. Thus C can be calculated as follows:

$$C = C_1 \times C_2 \times C_3$$

$$C = 1.0479 \times 0.99974 \times 1.0017 = 1.0404$$

Now the effective area ($A_E$) for the nozzle can be calculated as follows:

$$A_E = AC = 2.6398 \times 1.0404 = 2.77 \text{ ft}^2$$

From the foregoing, it is appreciated that the nozzle pitot averaging primary of the present invention is designed to enable one to accurately and precisely measure fluid flow in a moving air or gas system. In contrast to flow primaries of the prior art, the present nozzle pitot primary positively acts on the moving fluid system in such a manner as to actually aid in shaping the velocity profile such that the same is relatively uniform and predictable. This enables the pitot array to be strategically placed with respect to the nozzle and the resulting velocity profile so as to give a more precise flow measurement. In addition, the increased velocity through the nozzle inherently enhances accuracy. As pointed out above, various conventional mathematical approaches can be utilized to correct for flow and span discrepancies introduced by the nozzle type design.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A nozzle pitot primary device for measuring air or gas flow within a system of air or gas fluid moving within a conduit comprising: fluid constricting means in the form of a nozzle having a longitudinal axis and an external wall that defines a fluid flow opening therein for allowing a fluid such as air or gas to pass therethrough and further including an inlet end and an exiting end and wherein the external wall of said nozzle is flared inwardly from said inlet end towards said exiting end such that fluid is constricted as it passes therethrough, said nozzle being adapted to be positioned with respect to said conduit such that fluid passing through said conduit is constrained to move through said nozzle; pitot means operatively associated with said nozzle and positioned in the path of the fluid passing therethrough for effectively sensing the differential velocity pressure of the fluid passing through said nozzle, said pitot means including an array of averaging static and total pressure pitots disposed in a loop type configuration about said nozzle with pitots of said array having sensing ends that generally lie in a transverse plane inwardly of the external wall of said nozzle; said total pressure pitots including a plurality of openings spaced and disposed along the loop configuration with the openings being oriented to face the flow within said nozzle; said static pitots including a plurality of openings spaced and disposed along said loop configuration but which are oriented such that they face a direction generally perpendicular to the direction of flow within said nozzle; said loop configuration extending around the central axis of said nozzle and spaced inwardly of the adjacent external wall structure and wherein openings of both said static and total pressure pitots lie along the same loop configuration; and wherein said nozzle is shaped to provide flow constricting means for directing the system of fluid therethrough in such a manner that the resulting velocity profile of the moving fluid is relatively uniform across a substantial portion of the cross sectional area of the fluid flow opening within said nozzle, thereby enabling a relatively accurate determination of fluid flow to be made.

2. The nozzle pitot primary of claim 1 wherein said conduit having said moving system of fluid flowing therein is generally circular in cross section; and wherein the ratio of the inside diameter of said nozzle to the diameter of said conduit is approximately 0.7.

3. The nozzle pitot primary of claim 1 wherein said conduit having said moving system of fluid flowing therein is generally circular in cross section; and wherein the ratio of the inside diameter of said nozzle to the diameter of said conduit falls within a general range of 0.6–0.8.

4. The nozzle pitot primary of claim 1 wherein said nozzle pitot primary is in the form of a spool assembly with said nozzle being disposed interiorly and immediately between the ends of said spool assembly, and wherein said spool assembly includes an outer wall structure surrounding said nozzle and is adapted to be interconnected within said duct having said system of fluid moving therein.

5. The nozzle pitot primary of claim 4 wherein said spool assembly includes two tubular sections and wherein said nozzle includes an outwardly extending flange portion; and wherein said spool assembly includes coupling means for coupling the flange portion of said nozzle between two respective ends of said tubular sections comprising said spool assembly.

6. A nozzle pitot primary device for measuring air or gas flow within a system of air or gas fluid moving within a conduit comprising: fluid constricting means in the form of a nozzle having an external wall that defines a fluid flow opening therein for allowing a fluid such as air or gas to pass therethrough and further including an inlet end and an exiting end and wherein the external wall of said nozzle is flared inwardly from said inlet end towards said exiting end such that fluid is constricted as it passes therethrough, said nozzle being adapted to be positioned with respect to said conduit such that fluid passing through said conduit is constrained to move through said nozzle; pitot means operatively associated with said nozzle and positioned in the path of the fluid passing therethrough for effectively sensing the differential velocity pressure of the fluid passing through said nozzle, said pitot means including an array of averaging static and total pressure pitots disposed in a loop type configuration about said nozzle with pitots of said array having sensing ends that generally lie in a transverse plane across said nozzle; said total pressure pitots including a plurality of openings spaced and disposed along the loop configuration with the openings being oriented to face the flow within said nozzle; said static pitots including a plurality of openings spaced and disposed along said loop configuration but which are oriented such that they face a direction generally perpendicular to the direction of flow within said nozzle; said loop configuration extending around the central axis of said nozzle and spaced inwardly of the adjacent external wall structure and wherein openings of both said static and total pressure pitots lie along the same loop configuration; said total pressure pitots including a central point located along the central axis of said nozzle, a plurality of communicatively connected manifold extensions extending radially from said central point to the sensing ends of the respective total pressure pitots, and a total pressure line communicatively connected to at least one of said total pressure manifold extensions and leading therefrom for channeling a total pressure signal to appropriate instrumentation; said static pressure pitots including a central point located along the central axis of said nozzle, a plurality of communicatively connected manifold extensions extending radially from said central point to respective sensing ends of said static pressure pitots; and a static pressure line communicatively connected to at least one of said static pressure manifold extensions and leading therefrom for channeling a static pressure signal to appropriate instrumentation; and wherein said nozzle is shaped to provide flow constricting means for directing the system of fluid therethrough in such a manner that the resulting velocity profile of the moving fluid is relatively uniform across a substantial portion of the cross-sectional area of the fluid flow opening within said nozzle, thereby enabling a relatively accurate determination of fluid flow to be made.

7. The nozzle pitot primary of claim 6 wherein said central point of said total pressure pitots array and said central point of said static pressure pitots array are aligned and disposed in close side-by-side relationship and wherein the respective manifold extensions of said static and total pressure pitot array are circumferentially staggered about the central axis of said nozzle such that openings of said static and total pressure pitots are disposed in alternating fashion, one after the other, along said loop configuration.

8. The nozzle pitot primary of claim 7 wherein said static and total pressure pitots are formed in two separate arrays that are closely spaced together and wherein in each array a plurality of respective manifold extensions are generally equally spaced and radially extend from the respective central point of that particular array.

9. The nozzle pitot primary of claim 8 wherein each respective manifold extension extending from the respective central point is generally L-shaped and includes a transverse section that extends radially from the respective central point and a longitudinal section that is angled approximately 90 degrees with respect to said transverse section and which extends generally parallel to the flow of fluid within said nozzle.

10. The nozzle pitot primary of claims 1 or 6 wherein said nozzle is generally circular in cross section and wherein said loop type configuration having openings of said static and total pressure pitots lying thereon comprises a generally circular loop configuration wherein the respective openings of said static and total pressure pitots are generally equally spaced from the central axis of said nozzle; and wherein the ratio of the diameter of said generally circular loop configuration to the inside diameter of said nozzle adjacent the position assumed by said static and total pressure pitots is approximately 0.6.

11. The nozzle pitot primary of claim 10 wherein the ratio of the diameter of said circular loop configuration to the inside diameter of said nozzle adjacent to said circular loop configuration falls within the range of approximately 0.5–0.7.

12. The nozzle pitot primary of claims 1 or 6 wherein the ratio of the diameter of said loop configuration to the inside diameter of said nozzle adjacent the loop configuration is approximately 0.6.

13. The nozzle pitot primary of claim 12 wherein the diameter of said loop configuration to the inside diameter of said nozzle falls within the range of approximately 0.5–0.7.

14. The nozzle pitot primary of claims 1 or 6 wherein the ratio of the diameter of said nozzle adjacent said loop configuration to the diameter of said conduit is approximately 0.7.

* * * * *